(12) United States Patent
Hashimoto et al.

(10) Patent No.: US 7,315,358 B2
(45) Date of Patent: Jan. 1, 2008

(54) EVALUATION APPARATUS AND METHOD OF OPTICAL PARTS

(75) Inventors: Yasushi Hashimoto, Akiruno (JP); Chikako Kato, Machida (JP); Kazuya Nishimura, Akiruno (JP); Toshio Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 154 days.

(21) Appl. No.: 11/168,538

(22) Filed: Jun. 29, 2005

(65) Prior Publication Data

US 2006/0002244 A1 Jan. 5, 2006

(30) Foreign Application Priority Data

Jun. 30, 2004 (JP) .............................. 2004-194450

(51) Int. Cl.
*G01J 1/00* (2006.01)
(52) U.S. Cl. ...................... 356/121; 382/141; 382/600
(58) Field of Classification Search ........ 356/121–127, 356/39, 600, 614–624; 382/141, 309
See application file for complete search history.

(56) References Cited

U.S. PATENT DOCUMENTS 5,453,606 A 9/1995 Hojo 6,636,625 B1 * 10/2003 Nakayama et al. ......... 382/141

FOREIGN PATENT DOCUMENTS

WO WO 02/048760 6/2002

* cited by examiner

*Primary Examiner*—Gregory J. Toatley, Jr.
*Assistant Examiner*—Iyabo S Alli
(74) *Attorney, Agent, or Firm*—Kenyon & Kenyon LLP (57) ABSTRACT

An evaluation apparatus of optical parts has a holder having a frame which can hold a lens fixedly and another lens movably, a chart having a first transmission hole group and a second transmission hole group arranged on circumferences of concentric circles, a light source which irradiates the chart with a luminous flux, a CCD camera for picking up an image of the luminous flux transmitted through the first and second transmission hole groups, a processor, and a driving unit. By using a result picked up by the CCD camera, the processor computes coordinates of a center of each circle, on a circumference of which the luminous flux is imaged, and then it calculates an amount movement for the movably held lens by computing a distance between the respective centers of the circles. The driving unit moves the lens on the basis of this calculated amount of movement.

17 Claims, 9 Drawing Sheets

EVALUATION APPARATUS AND METHOD OF OPTICAL PARTS

This application claims benefits of Japanese Patent Application No. 2004-194450 filed in Japan on Jun. 30, 2004, the contents of which are hereby incorporated by reference.

BACKGROUND OF THE INVENTION

1. Field of the Invention

The present invention relates to an evaluation apparatus of a lens unit used at the time of the assembly of lens units such as a lens for cameras, an image pick-up unit and the like.

2. Description of the Related Art

Figure 1:
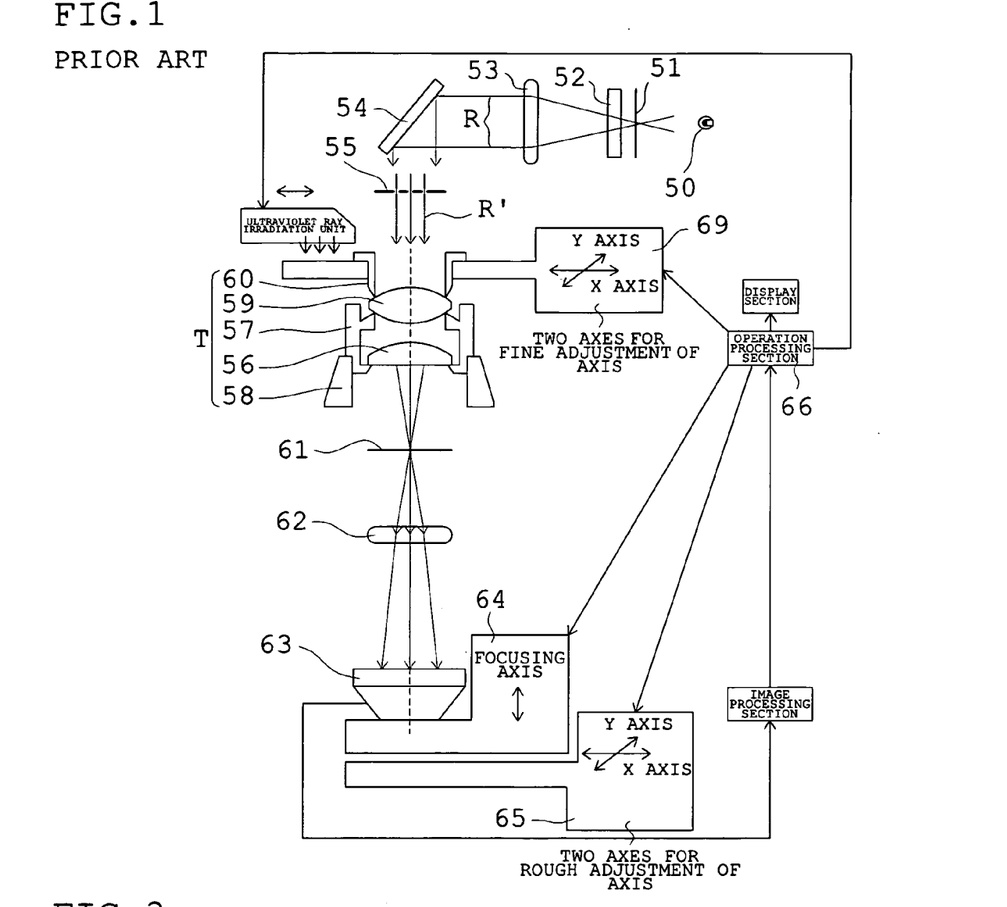
FIG. 1 is an outline block diagram of a conventional optical axis adjusting apparatus.
Figure 2:
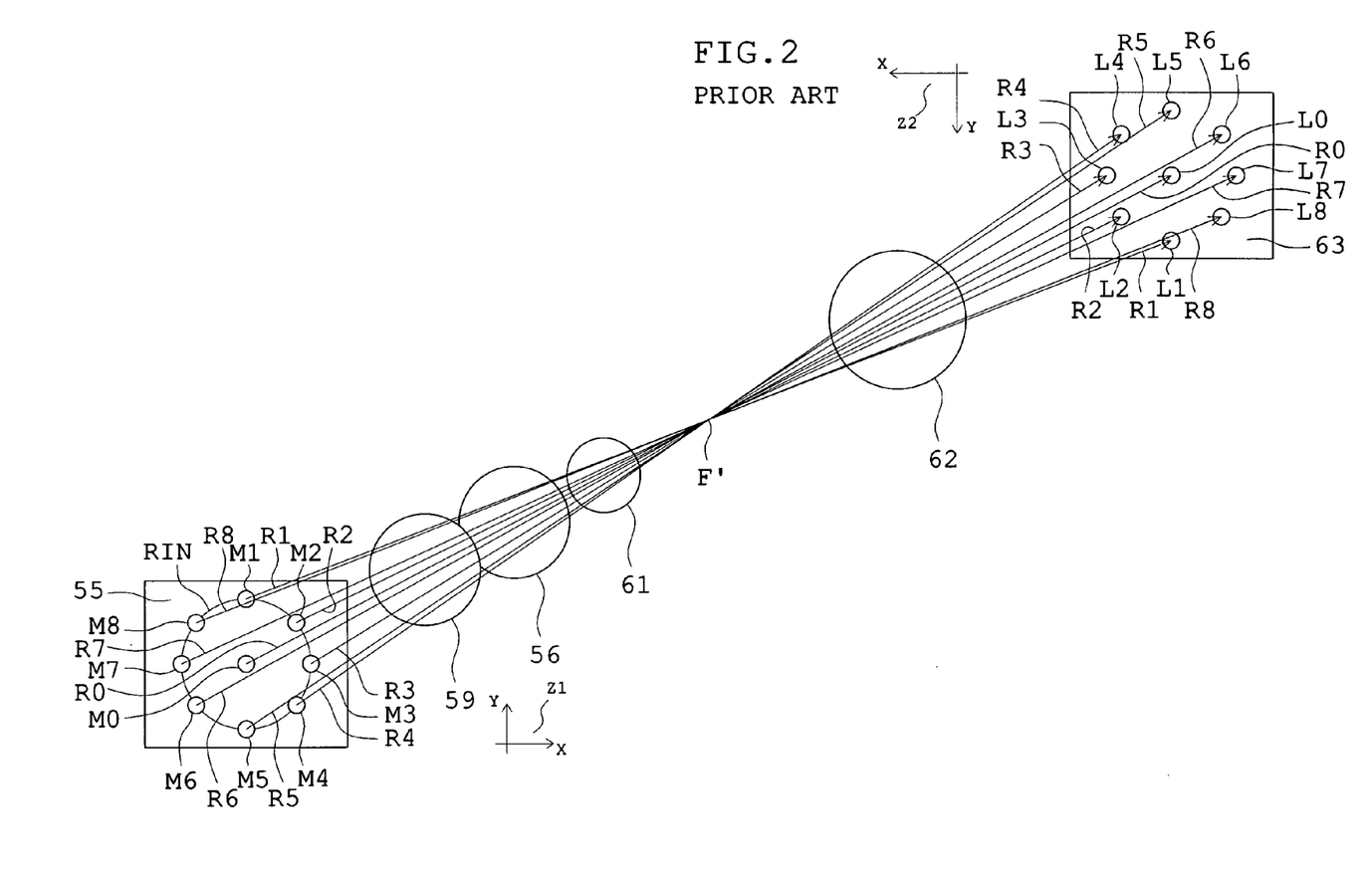
FIG. 2 is a diagram about image forming of the conventional optical axis adjusting apparatus.
Figure 3:
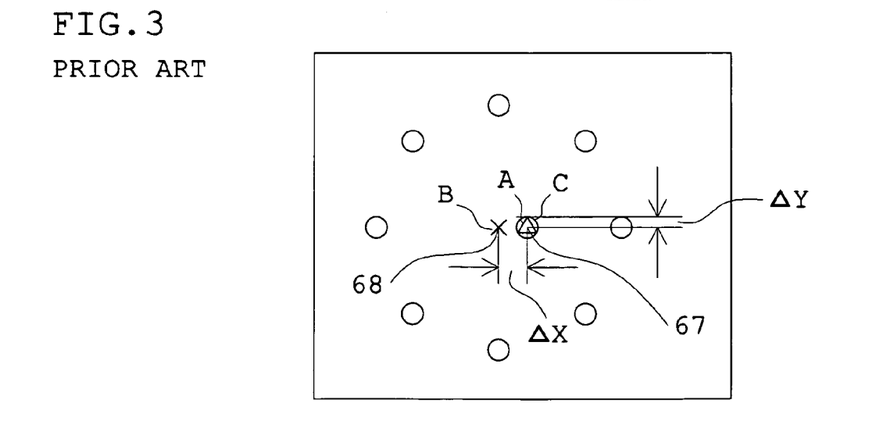
FIG. 3 is a diagram showing the image in the CCD camera image receiving surface of the conventional optical axis adjusting apparatus.

Using FIGS. 1, 2, and 3., an optical axis adjusting apparatus will be explained. FIG. 1 is an outline block diagram of the optical axis adjusting apparatus. FIG. 2 is a diagram about image forming of the optical axis adjusting apparatus. FIG. 3 is a diagram showing an image in a CCD camera image-receiving surface of the optical axis adjusting apparatus.

In FIG. 1, an optical axis adjusting apparatus of a lens unit is equipped with a light source 50, a pinhole plate 51 arranged at the left of the light source 50 which has a pinhole with diameter ($\phi$ about 0.6 μm) formed by pinhole processing, a ND filter 52 and a collimator lens 53 which are arranged at the left of the pinhole plate 51, and a mirror 54 arranged at the left of these.

In the lower part of the mirror 54 in FIG. 1, a chart 55 that is opaque and plate like shape is arranged. This chart 55 is arranged so that a surface of the chart 55 may become perpendicular to an optical axis of the light that enters to the chart 55.

On this chart 55 as shown in FIG. 2, a center point (M0) of the chart 55 and eight points (M1-M8) which are located in a line at equal intervals on a ring band, a center of which is the M0 are arranged. The pinhole processing has been carried out to each point of M1-M8.

In FIG. 1, an object lens system T is arranged under the chart 55. an object lens system T has a lens system 56, a lens holding frame 57 for fixing the lens system 56, an attachment portion 58 at a main body side to which this lens holding frame 57 is inserted, a lens system 59 which is an object of adjustment arranged at the upper part of the lens holding frame 57, and an adjustment jig 8 arranged so as to contact with the lens system 9, In an arbitrary position at the lower part of the object lens system T in FIG. 1, an image surface 61 is arranged. Under the image surface 61, a microscope lens 62, a CCD camera 63, and a focusing axis 64 are arranged. A microscope lens 62 is arranged so that the optical axis may coincide with the optical axis of the object lens system T. A CCD camera 63 is arranged under the microscope lens 62. This CCD camera 63 is arranged so that the image receiving surface may become perpendicular to the optical axis of the object lens system T.

The microscope lens 62 and the CCD camera 63, and the focal axis 64 mentioned above are mounted on a X-Y table which moves by two axes 65 for rough adjustment of axis, and an image is caught in the image receiving screen of the CCD camera 63 by adjusting two axes 65 for rough adjustment of axis.

Here, an image forming by the optical axis adjusting apparatus will be explained.

The light emitted from the light source 50 becomes parallel light rays R through the pinhole plate 51, the ND filter 52, and the collimator lens 53, and then they are reflected by the mirror 54 and become parallel light rays R' which go to a lower part from the mirror 54.

The parallel light rays R' are interrupted by the chart 55, and they pass the center point M0 of the chart 55 and eight points (M1-M8) located in a line at equal intervals on the ring band, the center of which is the center point M0, and then a pinhole image is formed to become nine light rays. Then, the nine light rays which have passed the chart 55 passes the object lens system T, and enter to an image surface 61. At this time, since most of the quantity of parallel light rays R' are shielded by the chart 55, only the nine pinhole images are formed on the CCD camera 63.

Here, when the optical axis of the lens system 59 ideally coincides with the optical axis of the lens system 56 and a whole optical system, in FIG. 2 a center of gravity position of irradiated points L1-L8 on the ring band obtained by light rays R1.R2, R3, R4, R5, R6, R7 and R8 which passed the lens systems 59 and 56, and an irradiated point L0 of the center obtained by the light ray R0 which passed the lens systems 59 and 56 coincides.

However, when the optical axis of the lens system 59 does not coincide with the optical axis of the lens system 56 and a whole optical system, a center of gravity position of the irradiated points L1-L8 on a ring band and a center point of the main irradiated point L0 will be shifted.

Then, in order that the center of gravity position of the irradiated points L1-L8 on the ring band and the center point of the main irradiated point L0 coincides, an optical axis adjustment using an operation processing section 66 and fine adjustment of the two axes is 69 is carried out. That is, in the operation processing section 66, by determining for the average of X coordinates XR1-XRm and Y coordinates YR1-YRm of all the picture elements of eight irradiated points which constitute the ring band except the main irradiated point 67 (refer to FIG. 3), a barycentric coordinates B (XG, YG) in the center of gravity 68 of the ring band is obtained.

Next, a deviation (XG-X0, YG-Y0) of the main coordinates A in the main irradiated point 67 (X0, Y0) and the barycentric coordinates B (XG, YG) in the center of gravity 68 of the ring band is detected as an amount of coma at the axis ($\Delta X$, $\Delta Y$). Then, the two axes 69 for fine adjustment is made to move slightly according to the detected amount of coma at the axis, and the optical axis adjustment is carried out by moving slightly the lens system 59 so that an amount of coma at the axis may be settled within a standard which been set, and an optical axis adjustment is carried out.

In detection of deviation of an optical axis in the first lens system (lens system 56 in FIG. 1) and the second lens system (lens system 59 in FIG. 1), a variation in detected value is a variation of the center of gravity of a main luminous flux and the center of a ring band luminous flux. It becomes variation of the coordinates of the center of gravity of the main luminous flux and of the center of a ring band luminous flux. According to the detection method mentioned here, the main coordinate of the ring band luminous flux are computed from the average of the luminous fluxes of eight points which constitute the ring band. By averaging the calculated value, the variation in the luminous fluxes of the eight points are offset, and the variation in the main coordinates becomes small compared with the variation in each luminous flux.

SUMMARY OF THE INVENTION

An evaluation apparatus of optical parts according to the present invention comprises a luminous flux generation part which generates two or more luminous fluxes, an image pick-up apparatus arranged at a position which receives light from the luminous flux generation part, a holding component which is arranged at the-luminous-flux generation part side than the imaging apparatus side and holds an optical component, and a processing apparatus which performs a predetermined processing based on an output information from the imaging apparatus, wherein the-luminous-flux generation part comprises at least a first domain group and a second domain group, two or more domains set in the first domain group are mutually and separately located on a first predetermined line, two or more domains set in the second domain group of are mutually and separately located on the second predetermined line, and the second domain group is located outside of the first domain group 2.

In the evaluation apparatus of optical parts according to the present invention, it is desirable that the first output information and the second output information are included in the output information, the first output information is an information obtained from images from the two or more images in the first domain group, the second output information is an information obtained from images from the two or more images in the second domain group, and the processing apparatus computes an information required for position adjustment of the optical component based on the on the first output information and the second output information.

In the evaluation apparatus of optical parts according to the present invention, it is desirable that the first output information is an information on a main position of the said first domain group, the second output information is an information on a main position of the second domain group, the information on the main position of the first domain group is an information obtained from all images of the two or more images in the first domain group, the information on the main position of the second domain group is an information obtained from all images of the two or more images in the second domain group.

An evaluation method of optical parts according to the present invention comprises the following steps: a step in which two or more domains set in the second domain group of are mutually and separately located on the second predetermined line; a step in which two or more domains set in the second domain group of are mutually and separately located on the second predetermined line; a step in which the second domain group is located outside the first domain group; a step in which the first domain group and the second domain group are imaged through an optical component; and a step in which adjusting of the optical parts is carried out by using an image information obtained from the image which has been picked up.

In the evaluation method of optical parts according to the present invention, it is desirable that it further comprises the following steps of: a step in which a main coordinate of the first domain group is computed using all of the image information of two or more domains in the first domain group, a step in which a main coordinate of the second domain group is computed using all of the image information of two or more domains in the second domain group, and an adjustment of the optical component is carried out based on the main coordinate of the first domain group and the main coordinate of the second domain group.

These and other features and advantages of the present invention will become apparent from the detailed description of the referred embodiments when taken in conjunction with the accompanying drawings.

DETAILED DESCRIPTION OF THE PREFERRED EMBODIMENTS

First Embodiment

Hereafter, based on FIGS. 4 to 9, embodiments according to the present invention will be explained.

Figures 4, 5:
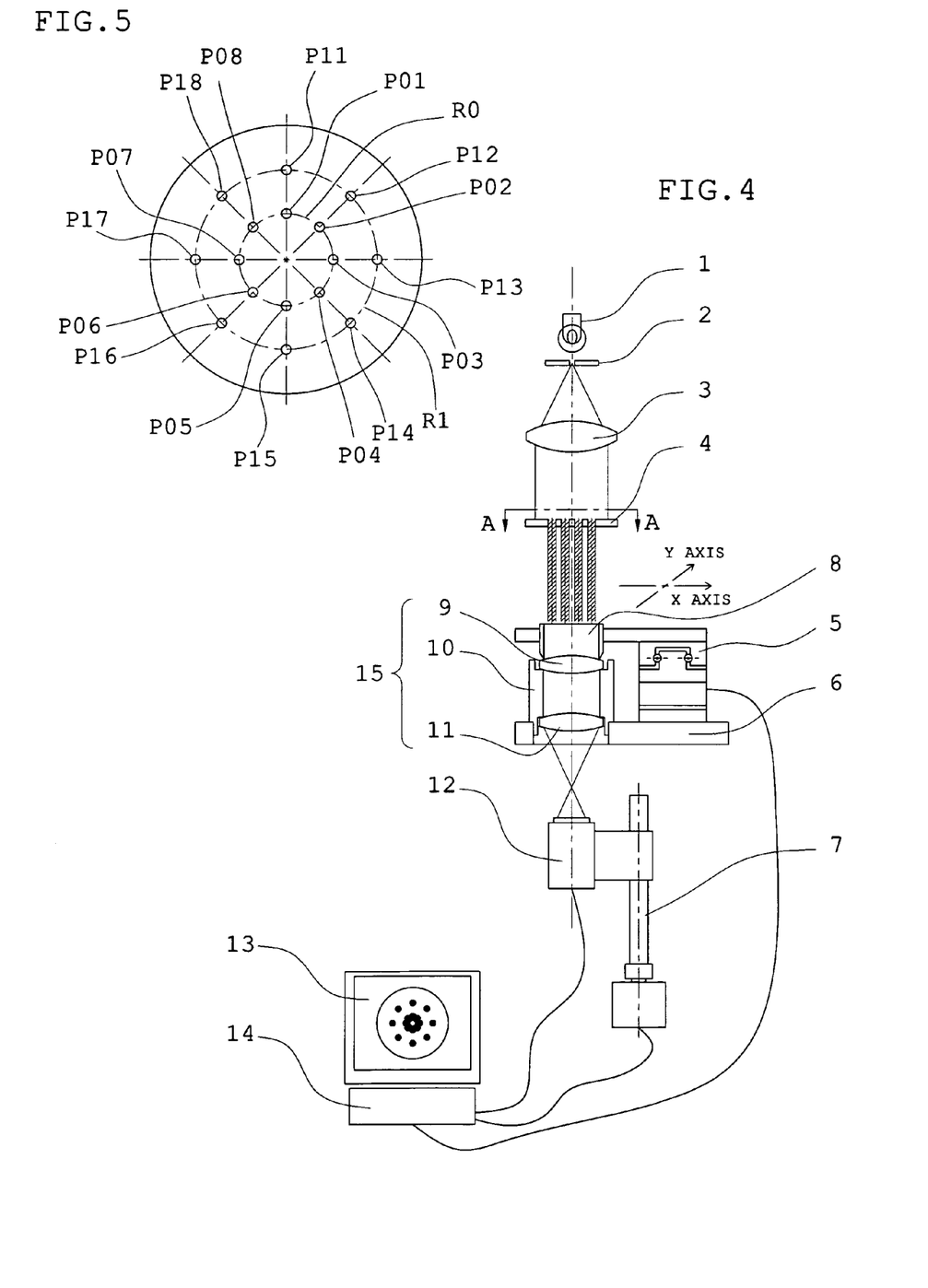
FIG. 4 is an outline block diagram of a first embodiment of the optical axis adjusting apparatus according to the present invention.
FIG. 5 is a diagram of a chart seen to direction of A-A in FIG. 4.
Figure 6:
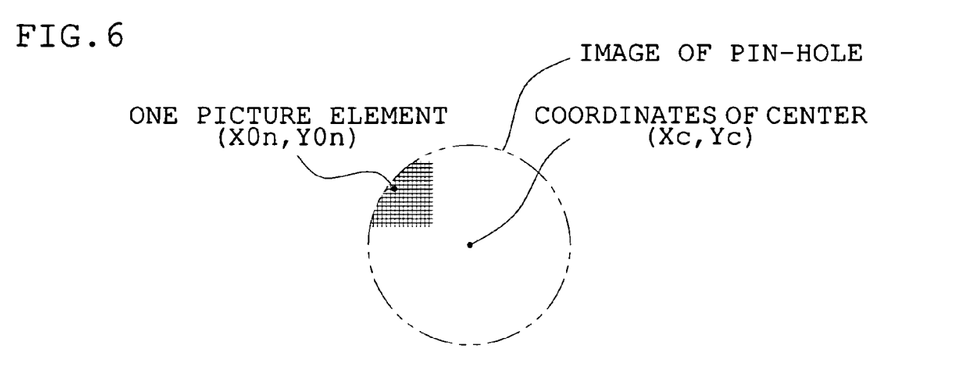
FIG. 6 is a pattern diagram of an observed pinhole image.
Figures 7, 8:
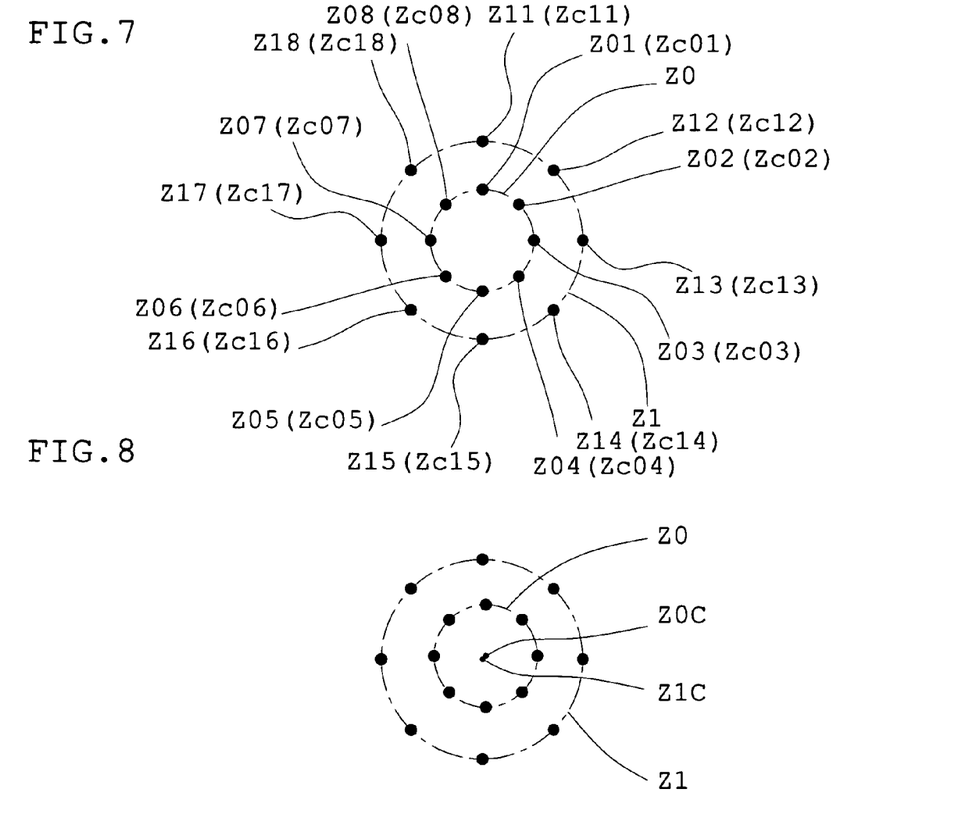
FIG. 7 is a pattern diagram of each pinhole image which constitutes a transmitted luminous flux displayed on the display equipment 13.
FIG. 8 is a pattern diagram showing the main coordinates of the transmitted luminous flux.
Figure 9:
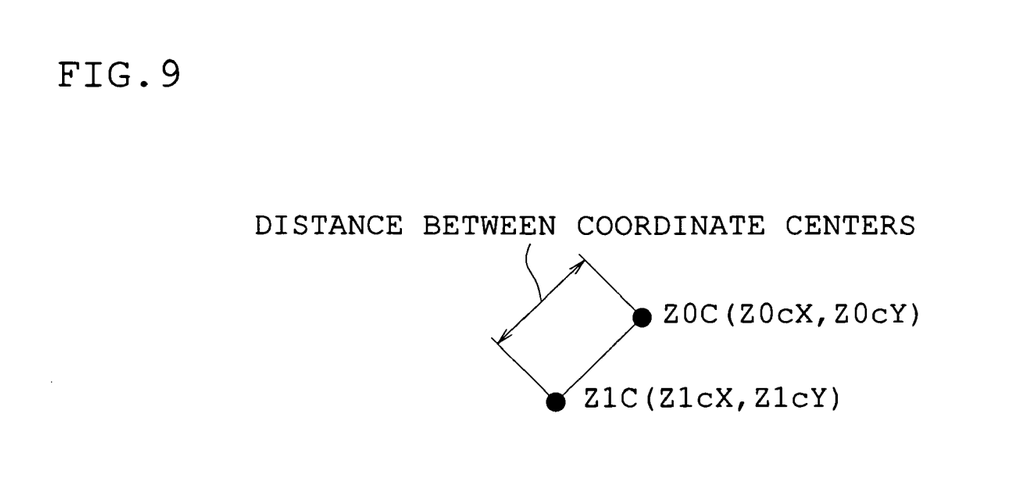
FIG. 9 is a diagram showing an enlarged portion of the main coordinates of FIG. 8.

FIG. 4 is an outline block diagram of an optical axis adjusting apparatus of the present embodiment. FIG. 5 is a diagram of a chart 4 seen to direction of A-A in FIG. 4. FIG. 6 is a pattern diagram of a pinhole image obtained by an image pick-up apparatus. FIG. 7 is a pattern diagram of each pinhole image which constitutes a transmitted luminous flux displayed on the display equipment 13. FIG. 8 is a pattern diagram showing main coordinates of each luminous flux. FIG. 9 is a diagram in which a main-coordinate portion shown in FIG. 8 is enlarged.

In FIG. 4, under a light source 1, a pinhole plate 2 to which pinhole processing has been carried out is arranged, and a collimator lens 3 is arranged under the pinhole plate 2. A chart 4 is arranged under the collimator lens 3. The chart 4 is a thin plate material of opaque disk form, and it is arranged so that the disk plane may become perpendicular to an optical axis of the lens system to be adjusted 15 mentioned later.

As shown in FIG. 5, the chart 4 has a transparent hole sequence R0, and a transparent hole sequence R1 arranged in a shape of a concentric circle to a circumference of the transparent hole sequence R0 This transparent hole sequence R1 is formed by arranging eight pinholes P011, P12, P13, P14, P15, P16, P17 and P18 at equal intervals on the circumference. The transparent hole sequence R1 is formed by arranging eight pinholes P011, P12, P13, P14, P15, P16, P17 and P18 at equal intervals on the circumference.

Here, although the pinholes P01-P08 and P11-P18 of the chart 4 may be formed by a usual metalworking, it is more desirable to give processing by photo etching processing that has better processing accuracy than the usual metalworking. Or it is desirable to form a substrate by parallel plane shape and to form pinholes P01-P08, and P11-P18 by pattern deposition with more sufficient processing accuracy than the usual metalworking.

In FIG. 4, at a lower part of the chart 4, the lens system 15 to be adjusted including a lens system 9, a jig 8 for centering arranged so as to contact with the lens system 9, a holding means 6 holding the lens system 15 to be adjusted, and a moving means 5 arranged on the holding means 6 are arranged. The jig 8 for centering is constituted such that it is connected with the moving means 5 and a motion of the moving means 5 transmits to a lens system 9 to be adjusted through the jig 8 for centering. The moving means 5 is composed such that it can move in the direction of X-Y that intersects perpendicularly with an optical axis of the lens system 15 to be adjusted.

The lens system 15 to be adjusted is equipped with a frame 10 for holding the lens system 9 and the lens system 11. Moreover, the holding means 6 holds the lens system 15 to be adjusted by holding the frame 10. Here, the lens system 11 is held at a state where it is fixed at the frame 10 before an optical axis adjustment.

The lens system 9 is held to the frame 10 so as to be movable before an optical axis adjustment is carried out. Between the lens system 9 and the frame 10, ultraviolet curing type adhesives is filled up before the optical axis adjustment is carried out. A lens system 9 is held by stiffening ultraviolet curing type adhesives by irradiating ultraviolet rays from an ultraviolet rays irradiation unit (not shown) after adjusting an optical axis.

Moreover, the frame 10 is arranged so that centers of transparent hole sequences R0 and R1 and an optical axis of the lens system 11 fixed to the frame 10 may coincide, and it is held by the holding means 6.

In addition, although in this embodiment the lens system 9 and the lens system 11 are held with the frame 10, the holding portion of the present invention is not limited to this. It may be constituted so that the lens system 11 that is the first optical element and the lens system 9 that is the second optical element may be held by a different holding portion.

In FIG. 4, a CCD camera 12 is arranged under the lens system 15 to be adjusted. The CCD camera 12 is constituted so as to move toward a direction of an optical axis of the lens system 15 to be adjusted by the drive means 7. Moreover, an operation processing section 14 for controlling CCD camera 12, the drive means 7, and the moving means 5 is arranged.

This operation processing section 14 is constituted so that coordinates of two luminous flux which transmitted two transparent hole sequences R0 and R1 and the lens system 15 to be adjusted may be detected. Concretely, the operation processing section 14 is constituted so that the distance between main coordinates may be computed by determining for the main coordinates (namely, circumference of each luminous flux) of two transparent hole sequences R0 and R1 from that image pick-up result and the amount of movement of a lens system 9 may be computed from this calculation result using the luminous flux which transmitted two transparent hole sequences R0 and R1 and lens system to be adjusted 15 which are imaged with CCD camera 12. In addition, an observation image of two transparent hole sequences R0 and R1 observed with the CCD camera 12 is displayed on a display equipment 13.

In the optical axis adjusting apparatus constituted as mentioned above, light emitted from the light source 1 transmits the pinhole plate 2, forms a point source, and becomes parallel luminous flux by the collimator lens 3. The parallel luminous flux emanated from the collimator lens 3 is irradiated to the chart 4 on which the transparent hole sequence R0 and R1 are arranged, and two transmitted luminous fluxes are irradiated to the lens 15 to be adjusted. Two transmitted luminous fluxes which transmitted the lens 15 to be adjusted is imaged with the CCD camera 12. This image is displayed on the display equipment 13.

As shown in FIG. 7, the display equipment 13 displays a transmitted luminous flux group Z0 which consists of pinhole images Z01, Z02, Z03, Z04, Z05, Z06, Z07, and Z08 which have transmitted the lens 15 to be adjusted, and a transmitted luminous flux group Z1 which consists of pinhole images Z11, Z12, Z13, Z14, Z15, Z16, Z17, and Z18.

The above-mentioned transmitted luminous flux groups Z0 and Z1 are adjusted so that the transmitted luminous flux groups Z0 and Z1 observed in the CCD camera 12 may become the maximum within a visual field of the CCD camera 12. This adjustment is carried out by the drive means 7 by moving the CCD camera 12 up or down toward a direction of an optical axis of the lens system 15 to be adjusted.

Next, a method of calculating a main coordinate (center position) of a transmitted luminous flux group using the barycentric coordinate (gravity position) which is detected from each luminous flux imaged with the CCD camera 12 by the operation processing section 14, that is, a method of calculating a main coordinate wherein the sum total of the barycentric coordinates of each luminous flux is obtained, and then its average value is obtained will be explained.

Images of two transmitted luminous flux groups Z0 and Z1 which have been picturized and observed by the CCD camera 12 are sent to the operation processing section 14, wherein an image processing is carried out to each of pinhole images which constitutes transmitted luminous flux groups Z0 and Z1 in the operation processing section 14. This image processing is carried out by such way that "1" is assigned to a picture element whose brightness is higher than a predetermined threshold value set up beforehand, and "0" is assigned to a picture element having other low brightness, and then two-digit processing of each picture element is carried out.

Here, a calculation of an amount of movement of a lens system 9 using pictures of the transmitted luminous flux groups Z0 and Z1 to each of which image processing has been performed will be explained.

By determining an average value of the picture element set to "1" in the two digit processing with respect to X coordinates X01-X0n and Y coordinate Y01-Y0n for every pinhole image, and barycentric coordinates (Xc, Yc) of each pinhole image are computed (refer to an example of FIG. 6).

The barycentric coordinates of each pinhole image can be determined from the following formula (1) and (2).

$$Xc=(X01\text{-}X0n \text{ in total})/n \quad (1)$$

$$Xc=(Y01\text{-}Y0n \text{ in total})/n \quad (2)$$

Using the formula (1) and (2), the barycentric coordinates Zc01, Zc02, Zc03, Zc04, Zc05, Zc06, Zc07, Zc08, Zc11, Zc12, Zc13, Zc14, Zc15, Zc16, Zc17, and Zc18 of each pinhole image are determined. An arrangement position of the barycentric coordinates of each calculated pinhole image is shown in a parenthesis of the symbol of each pinhole image in FIG. 7.

Using the barycentric coordinates of each pinhole image shown in FIG. 7, barycentric coordinates Z0c and Z1c of two transmitted luminous flux groups Z0 and Z1 from the following formula (3), (4), (5), and (6) (refer to FIG. 8) are determined.

$$X \text{ coordinate of } Z0c\text{:}Z0cX=(\text{sum total of } X \text{ coordinates of } Zc01\text{-}Zc08)/8 \quad (3)$$

$$Y \text{ coordinate of } Z0c\text{:}Z0cY=(\text{sum total of } Y \text{ coordinates of } Zc01\text{-}Zc08)/8 \quad (4)$$

$$X \text{ coordinate of } Z1c\text{:}Z1cX=(\text{sum total of } X \text{ coordinates of } Zc11\text{-}Zc18)/8 \quad (5)$$

$$Y \text{ coordinate of } Z1c\text{:}Z1cY=(\text{sum total of } Y \text{ coordinates of } Zc11\text{-}Zc18)/8 \quad (6)$$

Furthermore, by using main coordinates Z0c and Z1c which have been calculated by above-mentioned formula (3)-(6), a distance between main coordinates of two transmitted luminous flux groups are determined from the following formula (7) (refer to FIG. 9).

$$\{(Z1cX-Z0cX)^2+(Z1cY-Z0cY)^2\}^{1/2} \quad (7)$$

A corrected amount of movement is calculated according to the distance between main coordinates obtained from the formula (7). Here, a corrected amount of movement means what a constant k is multiplied to the obtained distance between main coordinates. The constant k is an inclination determined from an approximation straight line that is obtained by plotting the obtained distance between main coordinates on the graph, when a shift of an optical axis is given between the lens system 9 and the lens system 11, and it becomes a value to be setup for each lens to be adjusted. This corrected amount of movement is computed by the operation processing section 14 in a similar way of each calculation mentioned above.

Next, a method how to make coincide with an optical axis of the optical axis of the lens system 9, the lens system 11, and an optical system of the optical axis adjusting apparatus by moving lens system 9 based on the calculated value of main coordinates, will be explained.

The moving means 5 is moved based on the corrected amount of movement which the operation processing section 14 computed, and it is transmitted to the lens system 9 through a jig 8 for centering, and then the lens system 9 moves.

Here, in order to make it the distance between main coordinates computed settled in the standard set up beforehand, position adjustment of the lens system 9 is carried out repeatedly by the moving means 5. And it is the stage settled in the standard, Since a lens system 9 is fixed to a frame 10, ultraviolet rays are irradiated from a ultraviolet rays irradiation unit which is not illustrated for stiffening ultraviolet rays curing type adhesives.

Next, various examples of composition of a substrate concerning the present invention will be explained.

Figure 10:
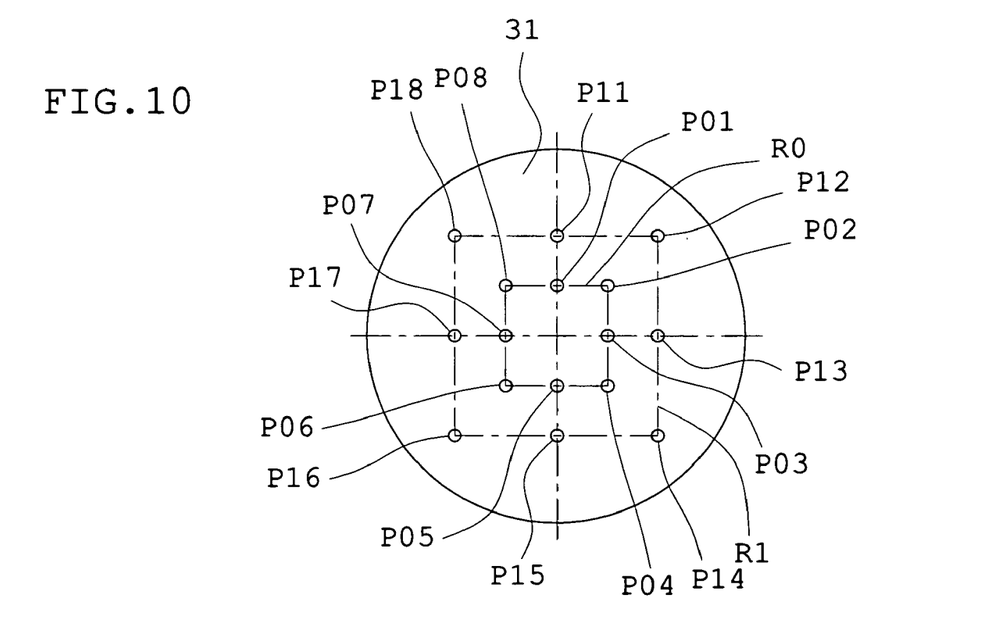
FIG. 10 is a plane view showing one example of composition of a chart.

FIG. 10 is a figure showing other example of composition of the chart as the substrate mentioned above concerning the present invention. In this example of composition, a substrate has a transparent hole sequence R0 and a transparent hole sequence R1, and it is composed such that a main coordinates of the transparent hole sequence R0 and a main coordinates of the transparent hole sequence R1 may coincide. The transparent hole sequences R0 and R1 are arranged in the shape of a rectangle. By replacing this chart 31 by the chart 4 in FIG. 4, and using it the same function and effect when using the chart 4 can be obtained.

Figure 11:
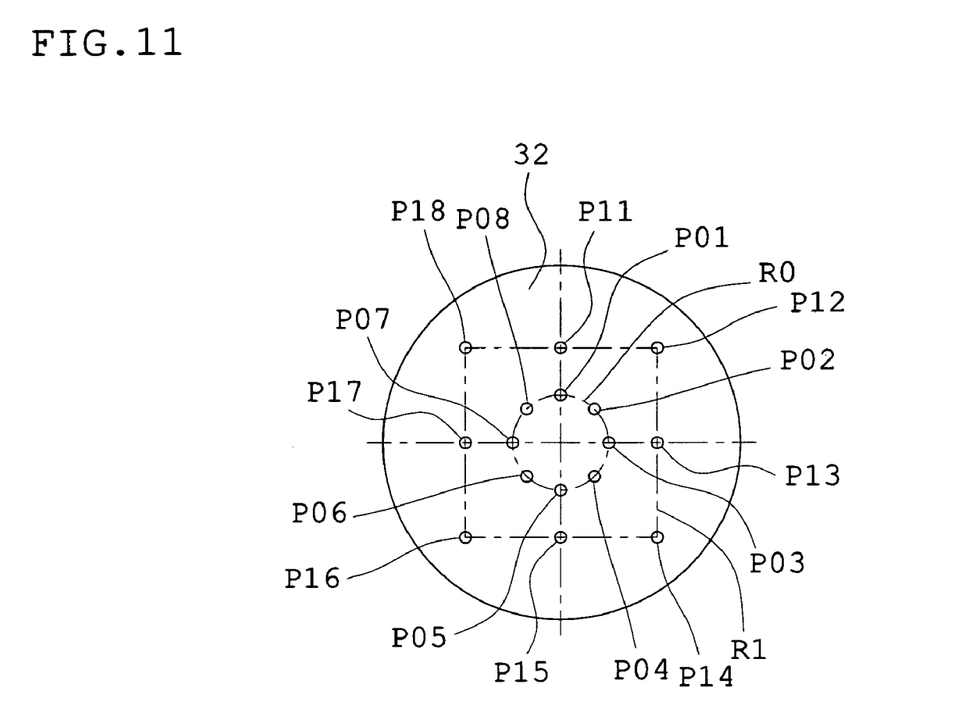
FIG. 11 is a plane view showing another example of composition of a chart.

FIG. 11 is a figure showing other example of composition of a chart as the substrate mentioned above concerning the present invention. In this example of composition, the pattern of the transparent hole arranged at the substrate serves as combination of the transparent hole sequence R0 arranged in the shape of a circle and the transparent hole sequence R1 arranged in the shape of a rectangle. In this example of composition, a substrate has a transparent hole sequence R0 and a transparent hole sequence R1, and it is composed such that a main coordinates of the transparent hole sequence R0 and a main coordinates of the transparent hole sequence R1 may coincide.

By replacing this chart 32 by the chart 4 in FIG. 4 and using it the same function and effect when using the chart 4 can be obtained.

Figure 12:
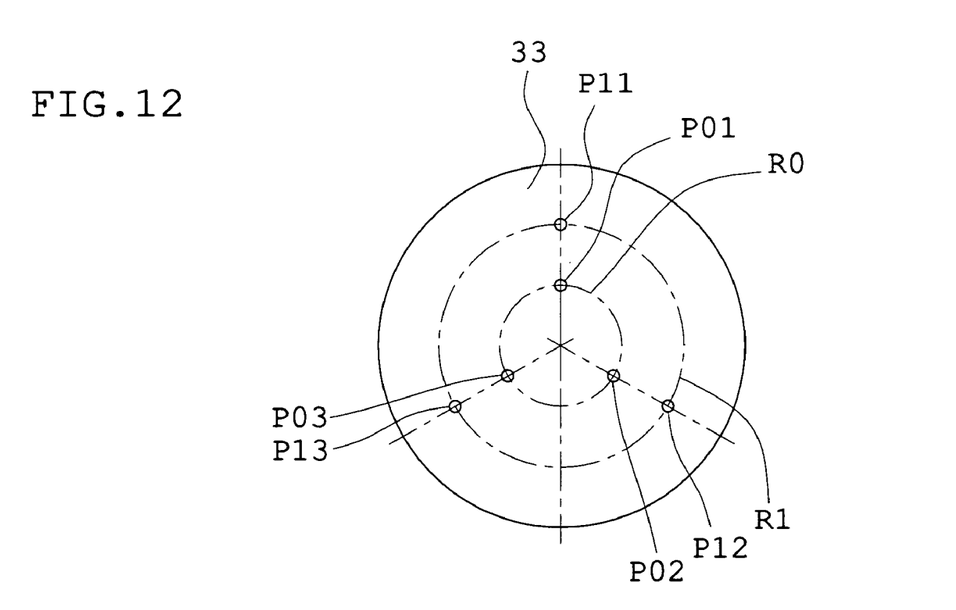
FIG. 12 is a plane view showing further other example of composition of a chart.

FIG. 12 is a figure showing other example of composition of a chart as the substrate mentioned above concerning the present invention.

In this example of composition three pinholes constituting a transparent hole sequence R0 arranged on the substrate is arranged at equal angle intervals on a concentric circle.

With respect to a transparent hole sequence R1, similarly three pinholes are arranged at tat equal angle interval on a concentric circle. Here, it is composed such that a main coordinates of the transparent hole sequence R0 and a main coordinates of the transparent hole sequence R1 may coincide. By using this chart 33 in place of the chart 4 in FIG. 4, the same function and effect in case of using the chart 4 can be obtained.

Second Embodiment

Hereafter, based on FIGS. 13 and 14, the second embodiment according to the present invention will be explained.

Figures 13, 14A, 14B:
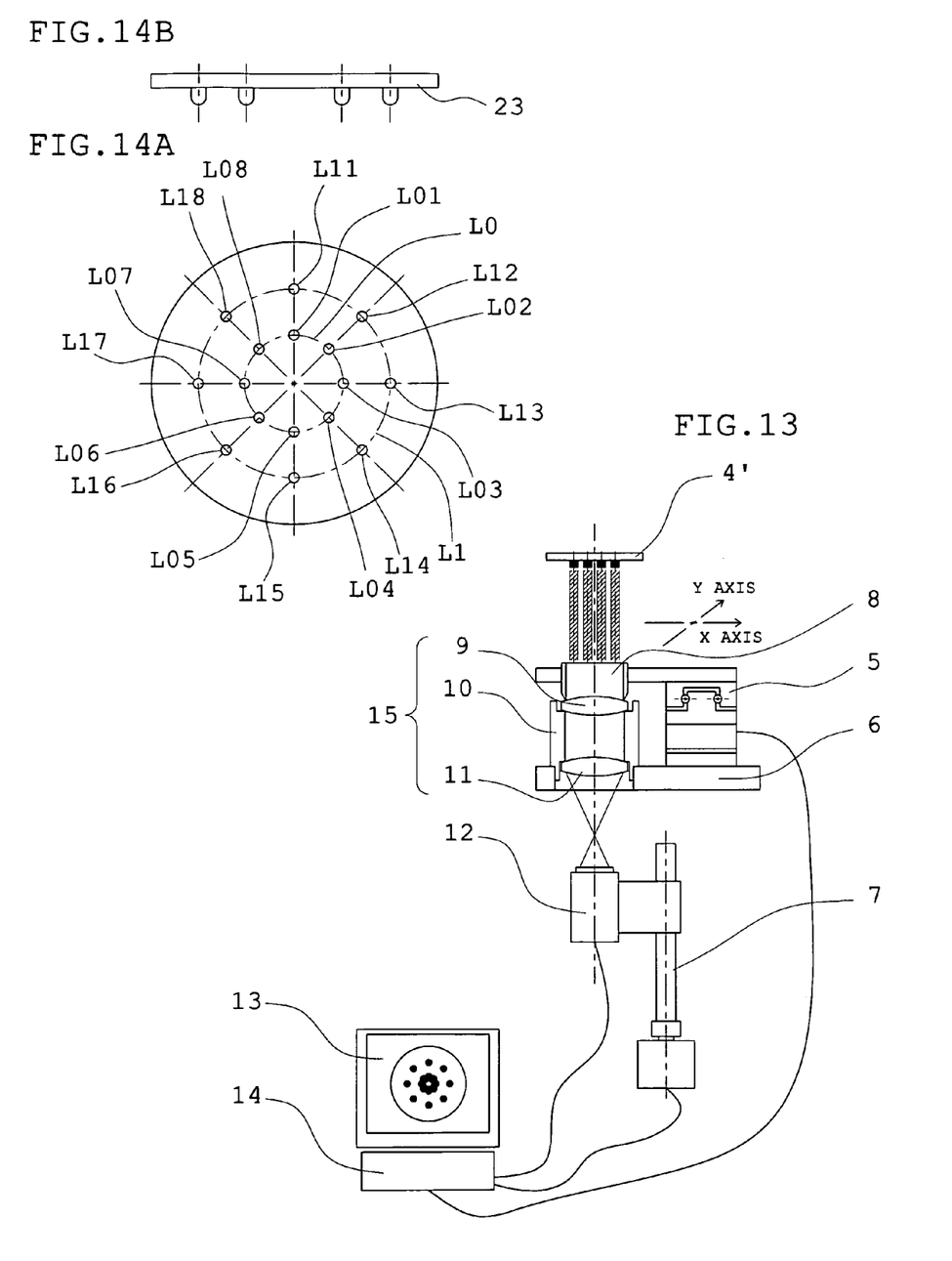
FIG. 13 is an outline block diagram of a second embodiment of the optical axis adjusting apparatus according to the present invention.
FIG. 14A is a detail drawing of a chart used for this embodiment.
FIG. 14B is a side elevation of FIG. 14A omitting a part of luminescence section.

FIG. 13 is an outline block diagram of a conventional optical axis adjusting apparatus. FIG. 14 is detail drawing of a chart used for this embodiment.

In this embodiment, comparing with the first embodiment, there is a difference such that a light source 4' having two or more luminescence sections is arranged instead of the light source 1, the pinhole plate 2, the collimator lens 3 and the chart 4. Other composition is the same as the first embodiment.

As shown in FIG. 14, the light source 4' is constituted on the substrate 23, where two or more luminescence sections are arranged. The light source 4' has a luminous flux ring L0 and a luminous flux ring L1 arranged at a concentric circle of the luminous flux ring L0.

This luminous flux ring L0 is formed by arranging eight luminescence sections L01, L02, L03, L04, L05, L06, L07, and L08 on the same circumference at equal intervals. This luminous flux ring L1 is formed by arranging eight luminescence sections L11, L12, L13, L14, L15, L16, 107, and L18 on the same circumference at equal intervals. The luminescence section constituting each luminous flux ring consists of light emitting devices, such as LED and LD, and an emanated luminous flux is formed into a parallel luminous flux.

In this embodiment, the same function and effect in the case of the first embodiment which consists of the light source 1, the pinhole plate 2, the collimator lens 3, and the chart 4, can be obtained.

In the second embodiment. although two luminous flux rings are arranged in the shape of a concentric circle, the same action and an effect can be obtained even if a luminescence section is arranged as shown in FIGS. 10, 11, and 12.

According to the present embodiment, since the main coordinates of transmitted luminous flux Z0 and Z1 are used for calculation of detected value, variation in each point can be offset and the variation in main coordinates can be made small. That is, the variation in detected value can be suppressed, and high detection resolving power can be realized. By this way, an optical axis adjustment in a small lens unit for which severe optical axis shifting accuracy is required becomes possible, and it can contribute to miniaturization of a lens unit.

Next, various examples of composition of a substrate concerning the present invention will be explained.

Figure 15:
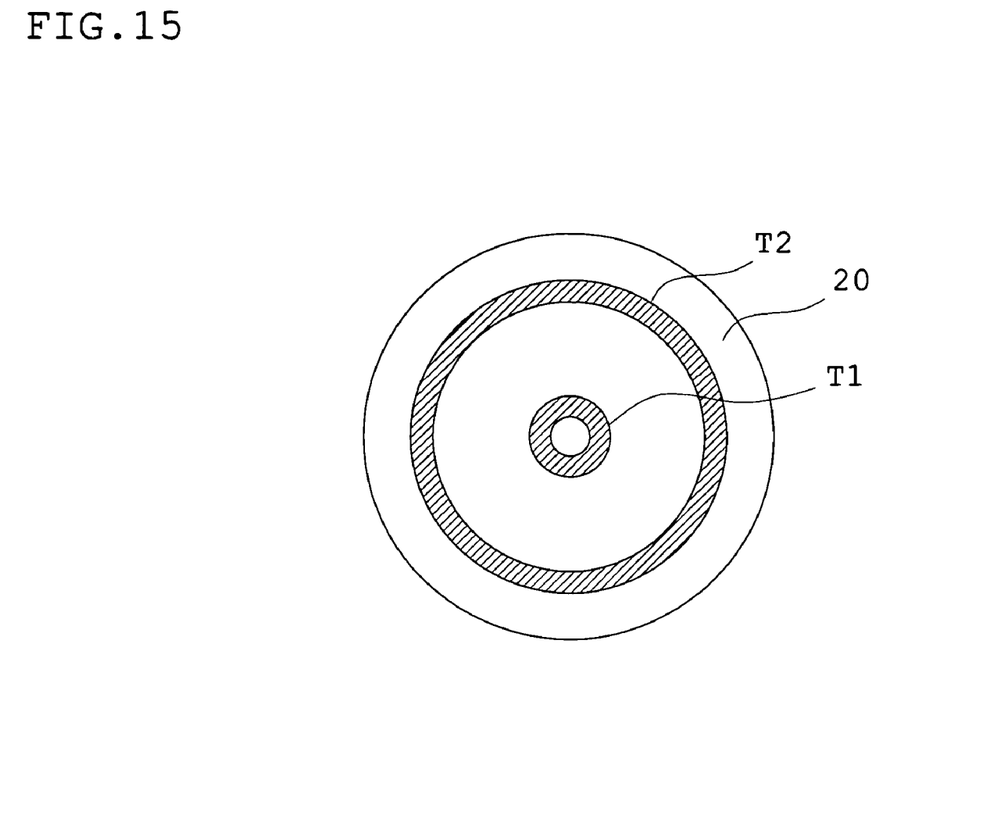
FIG. 15 is a diagram showing a chart which is constituted with a band on a circumference.

FIG. 15 is a diagram showing an example of composition of the chart as the substrate mentioned above concerning the present invention.

The chart 20 shown in FIG. 15 has a transparent hole T1 of a ring shape in replace of pinholes P01-P8 of the chart 4, and has a transparent hole T1 in replace of pinholes P11-P18 and a transparent hole T2 of a ring shape arranged at a concentric circle.

Here, transparent holes T1 and T2 in the chart 20 have the center of gravity position of each hole on the same circumference.

By replacing this chart 20 with the chart 4 in FIG. 4, and using it, the same function and effect when using the chart 4 can be obtained.

Figure 16:
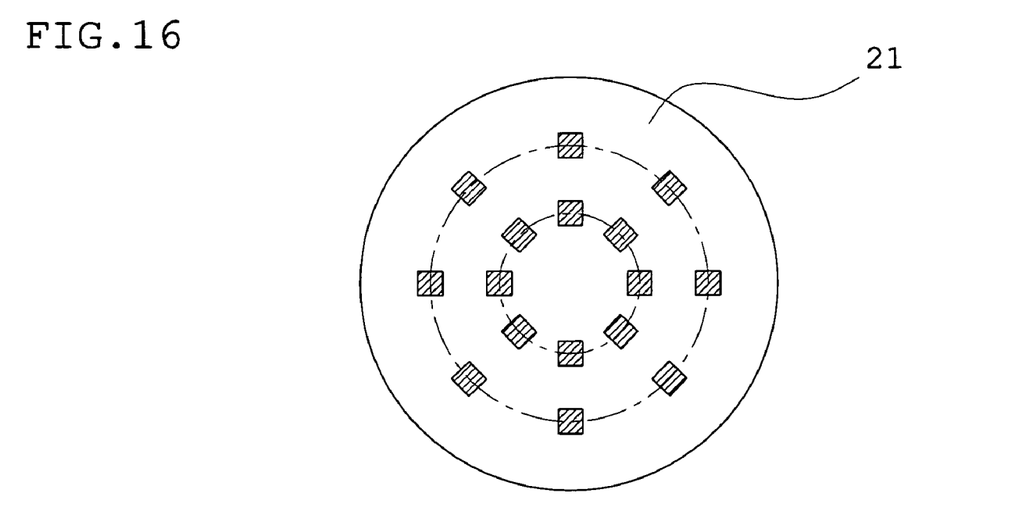
FIG. 16 is a diagram showing a chart in which transparent holes consist of holes having rectangle shape.

FIG. 16 is a diagram showing further other example of composition of the chart as the substrate mentioned above concerning the present invention, and it shows an example of the chart in which the first transparent hole and the second transparent hole are formed by four or more holes.

In FIG. 16, a chart 21 has eight holes which forms inner transparent holes arranged at a concentric circle of the circumference of the chart 21, and eight holes which form outer transparent hole sequence arranged at a concentric circle of the circumference of the inner transparent hole sequence. Each hole is formed to have a rectangle shape cross-section as shown in FIG. 16. Here, the first transparent hole and the second transparent hole in the chart 21 have the center of gravity position of each hole on the same circumference.

When this chart 21 is used by replacing with the chart 4 in FIG. 4, two luminous fluxes which have transmitted the chart 21 and become rectangular parallelepiped-shape can be obtained, and accordingly, the same function and effect as case of using the chart 4 can be obtained.

Figure 17:
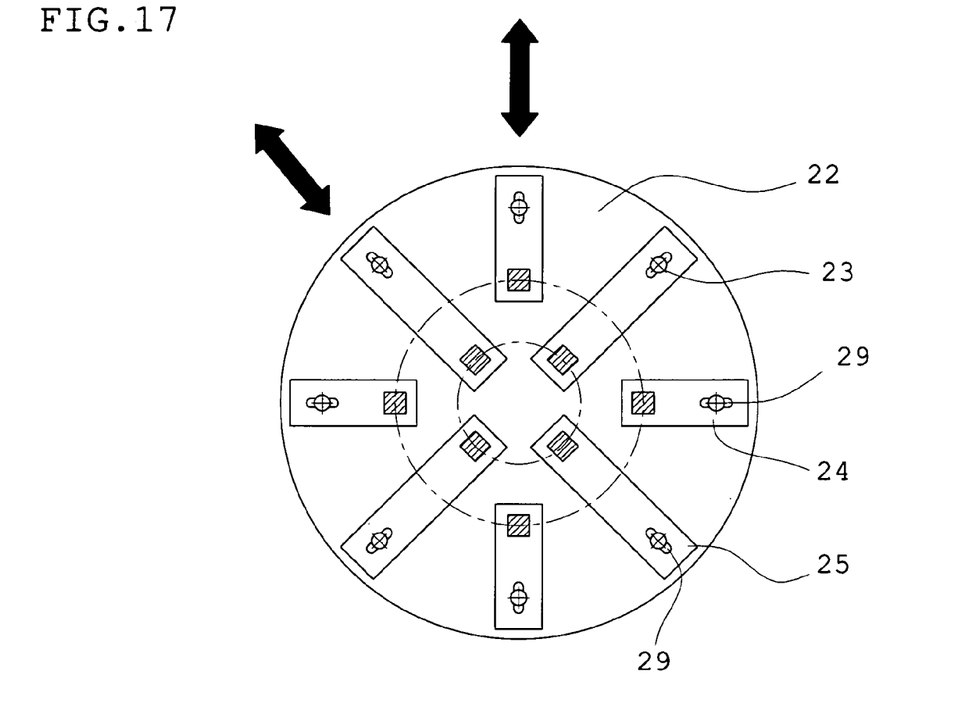
FIG. 17 is a diagram showing a chart which can change a magnitude of a circumference.

FIG. 17 is a diagram showing further other example of composition of a chart as the substrate mentioned above concerning the present invention.

It shows an example of a chart equipped with the circumference variable mechanism which can change a magnitude of a circumference of the luminous flux imaged by an imaging apparatus.

A chart 22 shown in FIG. 17 has two or more fixing screws 23, two or more aperture plates 24 fixed to the chart 22 by tightening each of fixed screws 23 two or more aperture plates 25 which has longer lengthwise than that of the aperture plate 24.

The aperture plate 24 is composed of a thin plate member having an elongated rectangle peripheral profile. It has a hole with rectangular cross-section at the end of a long side direction, and it has a fixing screw hole 29 at the other end of the long side direction. This fixing screw hole 29 is formed in the direction of an elongated side of the aperture plate 24 in long flat elliptical shape, and its width is formed in the almost same width as the diameter of the fixing screw 23.

This aperture plate 24 is arranged on the chart, where a hole of the plate is directed toward the central point of the chart 22, and the fixing screw hole 29 is directed toward the perimeter of the chart 22. A magnitude of a circumference of a luminous flux which forms a transparent hole at inside can be changed by moving the aperture plate 24 to a direction shown in FIG. 17 by arrow marks.

An aperture plate 25 is composed of a thin plate member having an elongated rectangle peripheral profile longer than that of the aperture plate 24 in an elongated side direction. This aperture plate 25 has a hole having the same constitution to the rectangle shape hole of the aperture plate 24, and a fixing screw hole 29 for fixing a screw of the aperture plate 24, having the same constitution of the fixing screw hole 29 for fixing the screw of the aperture plate 24.

As similar to case of the aperture plate 24, this aperture plate 25 is arranged at a chart, where a hole of the aperture plate is directed toward a central point of the chart 22, and a hole for fixing a screw is directed toward the perimeter of the chart 22. A magnitude of a circumference of the luminous flux which forms an outside transparent hole can be changed by moving the aperture plate 25 in a direction shown in FIG. 17 by arrow marks.

The chart 22 has a hole for fitting loosely (illustration is not shown) of almost equal size of the diameter of the hole for fixing a fixing screw 23 at a position where each fixing screw hole 29 is fixed by the fixing screw at the circumference corresponding to each fixing screw hole 29 of aperture plates 24 and 25. Moreover, the chart 22 has two or more free spaces (illustration is not shown) corresponding to the position which each hole of aperture plates 24 and 25 can move.

For changing a magnitude of the circumference of each transparent hole using the chart 22, each of aperture plates 24 and 25 is arranged at an arbitrary position on the chart 22, and each of aperture plates 24 and 25 is fixed on the chart 22 by screwing each fixing screw 23.

By replacing this chart 22 with the chart 4 in FIG. 4, and using it the same function and effect when using the chart 4 can be obtained.

In addition, the hole for fitting loosely arranged at the chart 22 has a diameter almost equal to the diameter of the fixing screw, and the free space formed in the chart 22 is closed by either of the aperture plates 24 and 25. Therefore, when a luminous flux is irradiated to the chart 22, the luminous flux will pass through only a hole which aperture plates 24 and 25 have, and two luminous fluxes required for computing an amount of movement of the lens system 9 will be obtained.

Figure 18:
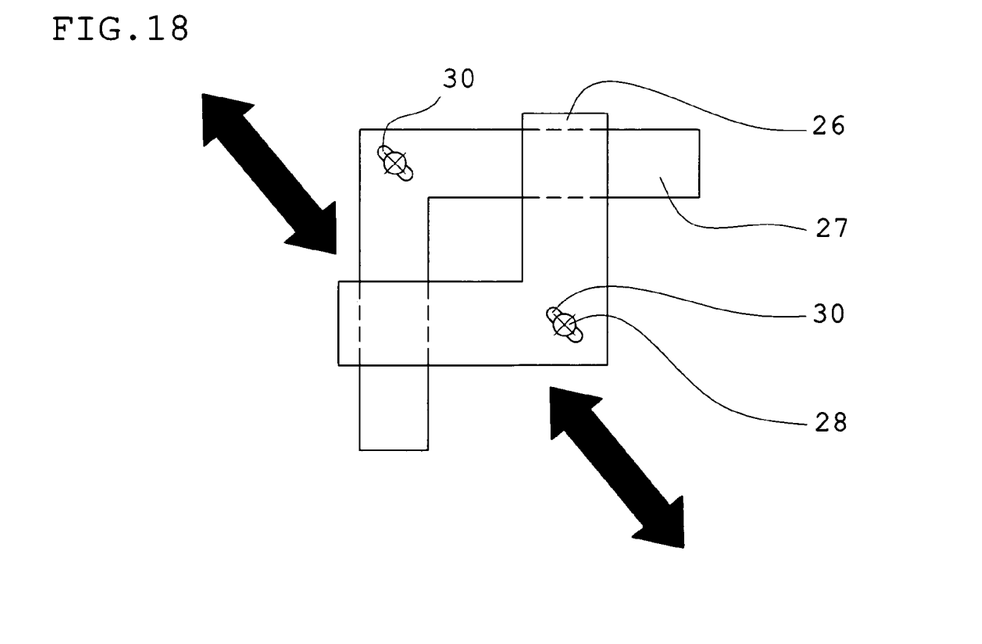
FIG. 18 is a diagram showing a constitution of a variable hole diameter mechanism which can change a magnitude of each hole of transparent holes.

FIG. 18 is a diagram showing the composition of the variable hole diameter mechanism which can change a magnitude of each hole about the first transparent hole and the second transparent hole of the charts shown in FIGS. 16 and 17.

In FIG. 18, the transparent hole plate 26 is formed with nearly L shape formed by bending an elongated profile plate component. This transparent hole plate 26 has a transparent hole 30 for a fixing screw 28 which fixes the transparent hole plate 26 and the chart, at a position near to the center of the bending portion. A transparent hole 30 of the transparent hole plate 26 is formed by a flat elliptical shape whose length of the longitudinal direction is shorter than a width of the transparent hole plate, and the width of the transparent hole 30 is formed to have the almost same width as the diameter of the fixing screw 28.

A transparent hole plate 27 is formed with nearly reversed L shape, which is formed by bending an elongated profile plate component similar to the transparent hole plate 26, toward a reversed direction in case of the transparent hole plate 26. The transparent hole plate 27 has a transparent hole 30 that is the same to the transparent hole 30 of the transparent hole plate 26 at a position near to the center of the bending portion.

A lock hole (illustration is not shown) for locking the fixed screw 28 is arranged on a chart (illustration is not shown) on which transparent hole plates 26 and 27 are arranged.

Although transparent hole plates 26 and 27 are locked only by one fixing screw 28 at each bending portion, by a frictional force of a surface where the transparent hole plate 26 and the transparent hole plate 27 touch, and by a frictional force of a surface where the chart and the transparent hole plate 26 touch, the transparent hole plates 26 and 27 are not shifted on the chart.

For changing a magnitude of the transparent hole using the transparent hole plates 26 on the chart, the fixing screw 28 which locks the transparent hole plate 26 on the chart is loosed, and the transparent hole plate 26 is moved to a direction of an arrow mark shown at the right-hand side of FIG. 18, and the transparent hole plate 26 is fixed to the position of the diameter of a desired transparent hole. For changing a magnitude of the transparent hole using the transparent hole plates 27, the transparent hole plate 27 is moved to the direction of an arrow mark shown at the left side of FIG. 18. Also, by moving both of transparent hole plates 26 and 27 a magnitude of the transparent hole may be adjusted.

Here, by a lock hole which the chart has, each of transparent holes 30 of the transparent hole plates 26 and 27, and two or more fixing screws 28, a direction which transparent hole plates 26 and 27 can move is restricted to the direction of a diameter of the chart. Therefore each of transparent holes obtained as a result of moving the transparent hole plates 26 and 27 is also located on a concentric circle centering on the main coordinates of the chart.

Thus, by moving the transparent hole plates 26 and 27, while holding each transparent hole at a position on a shape of a concentric circle centering on main coordinates, a size of a transparent hole shown in FIG. 16 or 17 can be changed.

According to the present invention, luminous fluxes which transmitted two transparent hole sequences (or luminous fluxes which emanated from the light source) are irradiated to a lens system to be adjusted. The transmitted luminous fluxes are observed and the main coordinates of two luminous fluxes are used for calculation of detected value. The main coordinates of two luminous fluxes is calculated by taking a total of the coordinate of each luminous flux which transmitted the transparent hole and using average of the total value. Thereby, a variation in each luminous flux is offset and a variation in the main coordinates can be made small compared with a variation in one luminous flux.

That is, according to the present invention, the variation in the detected value is suppressed, and high detection resolving power can be realized. By this, an optical axis adjustment in a small lens unit for which severe optical axis shifting accuracy is required becomes possible, and it can contribute to the miniaturization of a lens unit.

Further, an processing accuracy (a degree of alignment which aligns with sufficient accuracy on a circumference, concentricity of two transparent holes, etc.) of a transparent hole arranged on a substrate influences directly to a accuracy of the detected value. Accordingly, the substrate is produced by photo etching-pattern evaporation by paying attention to the fact that photo etching-pattern evaporation has about a double figure in processing accuracy than that of a normal metal working process. Consequently, a processing accuracy of a substrate can be improved and the accuracy of the detected value of a lens system to be adjusted can be improved.

Furthermore, it is constituted that a size of a circumference of luminous flux by the first transparent hole and a size of a circumference of luminous flux by the second transparent hole can be adjusted freely by a circumference variable mechanism. Therefore, a size of circumference of the transparent hole can be set to a circumference which is fitted to an optical property of the lens system to be adjusted, which is used as an object for adjustment. That is, it becomes unnecessary to change a substrate for every lens system to be adjusted.

What is claimed is:

1. An evaluation apparatus of optical parts comprising:
   a luminous flux generation part which generates a plurality of luminous fluxes,
   an image pick-up apparatus arranged at a position which receives light from the luminous flux generation part,
   a holding component which is arranged on a luminous flux generation part side in reference to the imaging apparatus and holds the optical parts, and
   a processing apparatus for carrying out a predetermined processing based on output information from the imaging apparatus,
   wherein the luminous flux generation part comprises at least a first domain group having a plurality of first domains and a second domain group having a plurality of second domains,
   wherein the plurality of first domains are mutually separately located on a first predetermined line,
   wherein the plurality of second domains are mutually separately located on a second predetermined line, and
   wherein the second domain group is located outside of the first domain group.

2. The evaluation apparatus of optical parts according to claim 1,
   wherein the luminous-flux generation part has a light source and a substrate, which is arranged between the light source and the holding component or between the holding component and the imaging apparatus, and
   wherein the plurality of first domains in the first domain group and the plurality of second domains in the second domain group are domains which transmit or reflect light.

3. The evaluation apparatus of optical parts according to claim 1, wherein the luminous flux generation part is constructed of a light source having a plurality of luminescence parts, and wherein the plurality of first domains in the first domain group and the plurality of second domains in the second domain group are constructed as the plurality of luminescence parts and are arranged at equal intervals on the first predetermined line and the second predetermined line.

4. The evaluation apparatus of optical parts according to claim 1, wherein the first predetermined line is a circumference of a circle.

5. The evaluation apparatus of optical parts according to claim 1, wherein the first predetermined line forms sides of a polygon.

6. The evaluation apparatus of optical parts according to claim 1, wherein the second predetermined line is a circumference of a circle.

7. The evaluation apparatus of optical parts according to claim 1, wherein the second predetermined line forms sides of a polygon.

8. The evaluation apparatus of optical parts according to claim 1, wherein all of the plurality of first domains in the first domain group have a same profile shape.

9. The evaluation apparatus of optical parts according to claim 1, wherein the plurality of first domains in the first domain group includes at least two types of domains different in profile shape.

10. The evaluation apparatus of optical parts according to claim 1, wherein all of the plurality of second domains in the second domain group have a same profile shape.

11. The evaluation apparatus of optical parts according to claim 1, wherein the plurality of second domains in the second domain group includes at least two types of domains different in profile shape.

12. The evaluation apparatus of optical parts according to claim 1, wherein each of the plurality of first domains or the plurality of second domains has a profile shaped as a circle.

13. The evaluation apparatus of optical parts according to claim 1, wherein each of the plurality of first domains or the plurality of second domains has a profile shared as a polygon.

14. The evaluation apparatus of optical parts according to claim 1,
wherein the output information includes first output information and second output information,
wherein the first output information is obtained from all of images of the plurality of first domains in the first domain group,
wherein the second output information is obtained from all of images of the plurality of second domains in the second domain group, and
wherein the processing apparatus computes information required for position adjustment of the optical parts on a basis of the first output information and the second output information.

15. The evaluation apparatus of optical parts according to claim 1,
wherein the output information includes first output information and second output information,
wherein the first output information is information on a center position of the first domain group,
wherein the second output information is information on a center position of the second domain group,
wherein the information on the center position of the first domain group is obtained from all of images of the plurality of first domains in the first domain group, and
wherein the information on the center position of the second domain group is obtained from all of images of the plurality of second domains in the second domain group.

16. An evaluation method of optical parts, comprising the following steps of:
arranging a plurality of first domains in a first domain group mutually separately on a first predetermined line;
arranging a plurality of second domains in a second domain group mutually separately on a second predetermined line;
arranging the second domain group outside the first domain group;
imaging the first domain group and the second domain group through the optical parts; and
adjusting the optical parts by using image information obtained from picked-up images.

17. The evaluation method of optical parts according to claim 16, further comprising the steps of:
computing center coordinates of the first domain group using all of image data on the plurality of first domains in the first domain group,
computing center coordinates of the second domain group using all of image data on the plurality of second domains in the second domain group, and
adjusting the optical parts on a basis of the center coordinates of the first domain group and the center coordinates of the second domain group.

* * * * *

UNITED STATES PATENT AND TRADEMARK OFFICE
CERTIFICATE OF CORRECTION

PATENT NO. : 7,315,358 B2
APPLICATION NO. : 11/168538
DATED : January 1, 2008
INVENTOR(S) : Y. Hashimoto et al.

It is certified that error appears in the above-identified patent and that said Letters Patent is hereby corrected as shown below:

Column 13, line 41, change "plurality of second domains has a profile shared as a" to -- plurality of second domains has a profile shaped as a --.

Signed and Sealed this

Twenty-first Day of December, 2010

David J. Kappos
*Director of the United States Patent and Trademark Office*